(12) United States Patent
Racette

(10) Patent No.: US 8,687,742 B2
(45) Date of Patent: Apr. 1, 2014

(54) DEVICE AND METHOD FOR GATHERING ENSEMBLE DATA SETS

(75) Inventor: Paul E. Racette, Edgewater, MD (US)

(73) Assignee: The United Sates of America as represented by the Administrator of the National Aeronautics and Space Administration, Washington, DC (US)

( * ) Notice: Subject to any disclaimer, the term of this patent is extended or adjusted under 35 U.S.C. 154(b) by 254 days.

(21) Appl. No.: 13/154,599

(22) Filed: Jun. 7, 2011

(65) Prior Publication Data

US 2011/0299640 A1 Dec. 8, 2011

Related U.S. Application Data

(60) Provisional application No. 61/352,167, filed on Jun. 7, 2010.

(51) Int. Cl.
*H04L 27/06* (2006.01)

(52) U.S. Cl.
USPC ..... 375/340; 375/224; 324/76.11; 324/76.14; 702/111

(58) Field of Classification Search
USPC .................. 375/224, 340, 345, 227; 324/601, 324/76.11, 76.14, 537, 750.01; 702/57, 85, 702/108, 111, 127, 189
See application file for complete search history.

(56) References Cited

U.S. PATENT DOCUMENTS

| | | | | |
|---|---|---|---|---|
| 3,628,151 | A * | 12/1971 | Roeder | 324/76.14 |
| 3,787,857 | A * | 1/1974 | Lazarchik et al. | 342/351 |
| 4,292,638 | A * | 9/1981 | Lazarchik et al. | 342/88 |
| 4,568,200 | A * | 2/1986 | Hatono et al. | 374/122 |
| 4,627,442 | A * | 12/1986 | Land | 600/549 |
| 6,133,869 | A * | 10/2000 | McGill | 342/351 |
| 2003/0020498 | A1 * | 1/2003 | Kamata | 324/719 |

* cited by examiner

*Primary Examiner* — Jean B Corrielus (57) ABSTRACT

An ensemble detector uses calibrated noise references to produce ensemble sets of data from which properties of non-stationary processes may be extracted. The ensemble detector comprising: a receiver; a switching device coupled to the receiver, the switching device configured to selectively connect each of a plurality of reference noise signals to the receiver; and a gain modulation circuit coupled to the receiver and configured to vary a gain of the receiver based on a forcing signal; whereby the switching device selectively connects each of the plurality of reference noise signals to the receiver to produce an output signal derived from the plurality of reference noise signals and the forcing signal.

11 Claims, 7 Drawing Sheets

FIG. 1

(PRIOR ART)

DEVICE AND METHOD FOR GATHERING ENSEMBLE DATA SETS

CROSS REFERENCE TO RELATED APPLICATION

This application claims priority to U.S. Provisional Application No. 61/352,167 filed Jun. 7, 2010 herein incorporated by reference in its entirety.

FIELD

The aspects of the present disclosure relate generally to the field of noise assisted data analysis and in particular to a system and method for analyzing and modeling non-stationary signals.

BACKGROUND

A process is non-stationary if its statistical moments change across space, time or sampling interval. Characterization of non-stationary processes is a challenge in many engineering and scientific disciplines. Climate change modeling and projection, retrieving drop-size information from Doppler measurements of hydrometeors, modeling calibration architectures and algorithms in microwave radiometers are example applications that can benefit from improvements in the analysis and modeling of non-stationary processes.

Calibration provides the condition by which assignment of value can be made and the means of discriminating a signal from background noise. Calibration using standard references provides the means by which we can compare measurements across space and time. These properties make applicable the use of calibrated noise measurements to detecting varying statistical properties of non-stationary processes and quantifying how the statistics change with time, location, sampling interval, etc.

Figure 1:
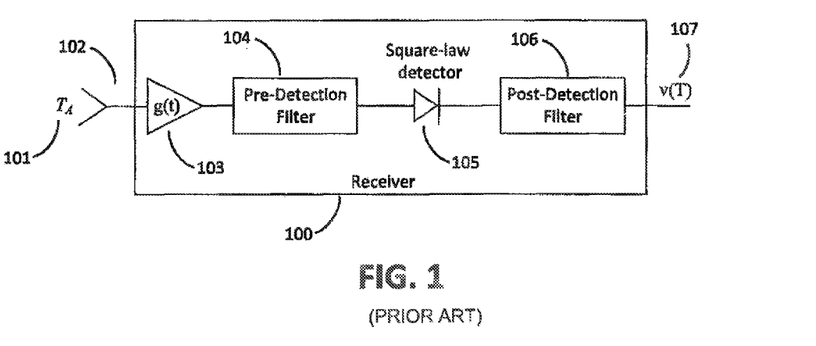
FIG. 1 illustrates a general model for a radiometer system.

The concept of Ensemble Detection originates from mathematical modeling of radiometer systems and the measurement of calibrated noise. Radiometers have to be frequently, and usually periodically, calibrated to correct for fluctuations in the receiver response. FIG. 1 illustrates a general model for a radiometer system. The signal to be measured 101, denoted by $T_A$, is received by the antenna 102, and input to the receiver 100. The receiver 100 comprises a representative gain 103, g(t), a pre-detection filter 104, a square-law detector 105, and a post-detection filter 106. An output voltage 107 is generated which can be used to estimate the noise power of the signal being measured 101. There are a number of sources that cause non-stationary fluctuations in the radiometer response. In practice, many sources of fluctuations can be described by a time varying fluctuation in the receiver gain, g(t). Noise reference measurements are used within a calibration algorithm to remove instrumental effects from the brightness scene being measured.

Previous attempts to model receiver fluctuations within the context of a calibration algorithm relied on the spectral representation of the fluctuations. However spectral representation of non-stationary signals is mathematically inconsistent and is limited in its practical application. Other techniques for modeling non-stationary fluctuations, such as in the receiver response, exist; wavelet analysis, evolutionary spectra, and windowed processes are examples. Each approach has its limitation in either analytical modeling and/or empirical analysis of non-stationary fluctuations. Empirical Mode Decomposition and Hilbert-Huang Transform are promising and powerful tools for non-stationary data analysis. However, these tools are empirically based and lack a theoretical framework to describe, for example, the measurement of calibrated noise.

A technique has been developed which uses measurement uncertainty as a figure of merit to compare the performance of various radiometer calibration architectures and algorithms. The technique, derived from stochastic process theory, treats the output of a radiometer that samples multiple noise references as an ensemble collection of measurements of the receiver fluctuations. This formulation enables the comparison of statistical analysis of data with theoretical calculation of the measurement uncertainty. The mathematics provides the foundation for Ensemble Detection and its application.

Analyses of measured signals have traditionally been limited to a single measurement series, i.e., a single realization. Fourier Analysis, Auto Regressive Moving Average, and Empirical Mode Decomposition are example signal processing techniques that are applied to single realizations of a process. An ensemble set is comprised of multiple realizations of a process. There are many practical applications of statistical analysis using ensemble sets of data. As an example, the Intergovernmental Panel on Climate Change in its fourth climate assessment used an ensemble set derived from multi-model analyses (output from different climate models) to estimate the uncertainty in climate model projections. The value in statistical analysis of ensemble sets gives rise to a need for new means for producing ensemble sets of data.

It would be advantageous to alleviate the problems associated with the prior art and to produce ensemble data sets for which empirical analysis has a direct link to stochastic process theory. Accordingly, it would be desirable to provide a method and system that addresses at least some of the problems identified above.

BRIEF DESCRIPTION OF THE DISCLOSED EMBODIMENTS

As described herein, the exemplary embodiments overcome one or more of the above or other disadvantages known in the art.

One aspect of the exemplary embodiments relates to a detector for producing ensemble sets of data. In one embodiment the ensemble detector comprises: a receiver; a switching device coupled to the receiver, the switching device configured to selectively connect each of a plurality of reference noise signals to the receiver; and a gain modulation circuit coupled to the receiver and configured to vary a gain of the receiver based on a forcing signal; whereby the switching device selectively connects each of the plurality of reference noise signals to the receiver to produce an output signal derived from the plurality of reference noise signals and the forcing signal. Post processing may be used to decompose the output signal into an ensemble set comprised of each noise reference mixed with the forcing signal.

Another aspect of the exemplary embodiments relates to a method for collecting an ensemble set of noise power measurements. In one embodiment the method comprises: selecting a reference noise signal from a plurality of reference noise signals; receiving the selected reference noise signal in a receiver; modulating a gain of the receiver with a forcing signal to produce an output signal; recording the output signal to create a sample; and repeating the selecting, receiving, modulating and recording steps for each of a plurality of reference noise signals to produce an ensemble set of samples.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

DETAILED DESCRIPTION OF THE EXEMPLARY EMBODIMENTS OF THE DISCLOSURE

Analyses of measured signals have traditionally been limited to a single measurement series. Ensemble Detection is a technique whereby an ensemble measurement set of a process is collected. The collection of ensemble samples enables new methods for analyzing random signals and offers powerful new approaches to studying and analyzing non stationary processes. Derived information contained in the dynamic statistical moments of a process will enable many novel applications.

Figure 2:
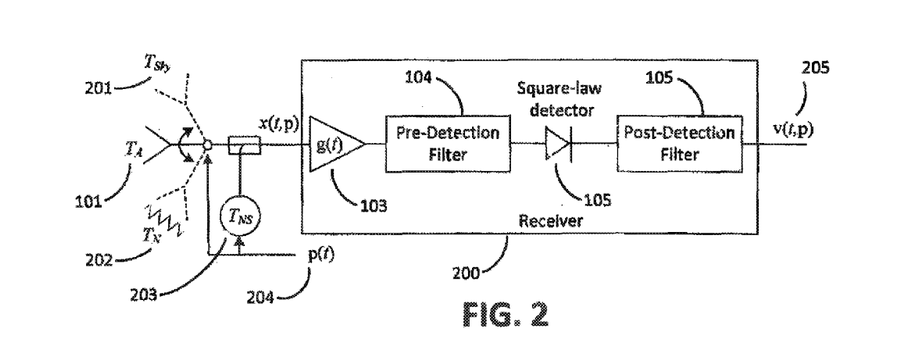
FIG. 2 illustrates a switched input radiometer system.
Figure 3:
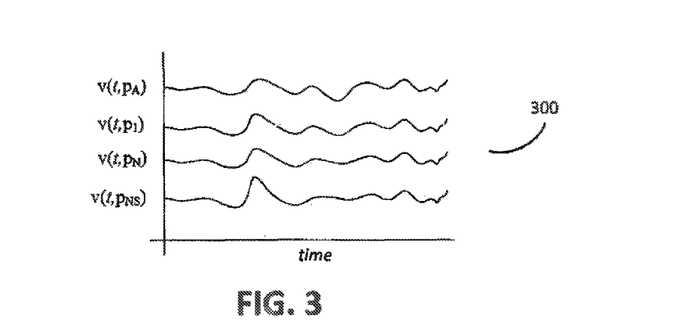
FIG. 3 illustrates an ensemble set of signal realizations.
Figure 5:
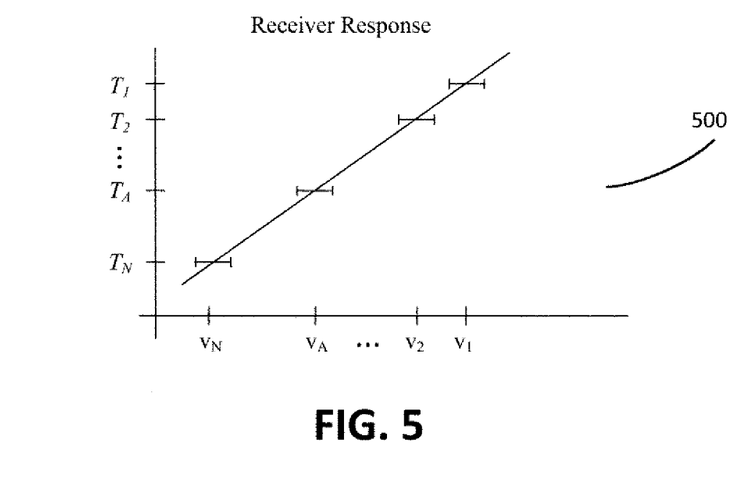
FIG. 5 illustrates receiver response from collection of noise measurements.

In describing the aspects of the disclosed embodiments, reference is made to the drawings, wherein there is seen in FIG. 2 a radiometer system that switches between a number of calibration references. The operation of the radiometer is described in detail to facilitate understanding of the function of the Ensemble Detector. Calibrating the radiometer is necessary to overcome the deleterious effects of non-stationary gain fluctuations in the receiver. The input to the radiometer 200 is switched between the measurand 101, and a plurality of stable references, 201, 202, 203 by a switching signal 204, p(t). These stable references can include sources such as 'blackbody' coaxial terminations, a noise diode, or noise power from the sky. The output voltage 205, v(t,p), of the radiometer 200 can then be recorded for each input to create an ensemble set 300 of signal realizations as shown in FIG. 3. The output voltage 205 is linearly proportional to the reference noise power, 102. This relationship 500, is shown in FIG. 5. The ensemble set 300 is then used in a calibration algorithm to produce an estimate of the measurand 101, $T_A$ i.e. $\hat{T}_A^M$, where:

$$\hat{T}_A^M = f(v_A(t_A), \{v_1(t_1), T_1\}, \ldots, \{v_N(t_N), T_N\})$$

Superscript M denotes that the estimate is made from measurements. For $T_A$ constant, the standard deviation estimates the uncertainty in the measurement, i.e. $\hat{\sigma}_{\hat{T}_A}^2 = \langle (\hat{T}_A^M - T_A)^2 \rangle$, where $\langle \cdot \rangle$ indicates statistical analysis of the data.

Figure 4:
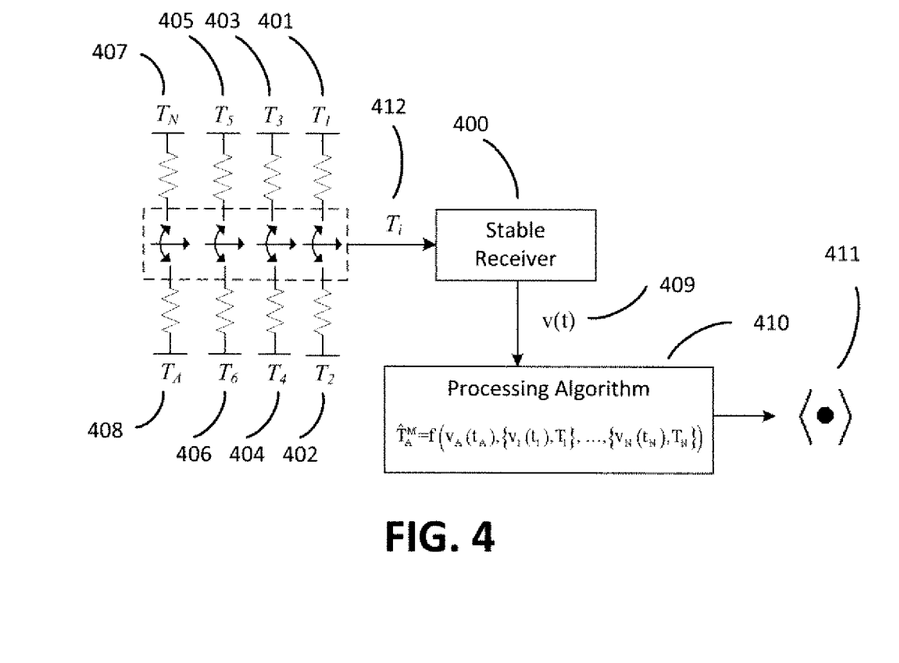
FIG. 4 illustrates the process of ensemble detection.

FIG. 4 illustrates a mathematical model of a switched radiometer for which the references and receiver are stable. The stable receiver 400 sequentially samples a set of ultra-stable references 401-408 that span a range of noise power. Practically, the noise signals produced by these stable references are assumed to have a Gaussian probability distribution. The 'ultra-stable' references should be stable relative to the measurand over the interval of measurement; stability of the noise power and the second moment of the noise power are of greatest concern. Alternatively, or in conjunction, the noise references can be calibrated references. Calibration provides an understanding of the reference signals that can be used to aid analysis. The ensemble set 300 is then used in a calibration algorithm, $\hat{T}_A = f(v,T)$, to calculate an estimate of the measurand, $\hat{T}_A$. The algorithm and uncertainty inherent in the reference measurements, and the calibrated reference values are used to model the measurement uncertainty: $\sigma_{\hat{T}_A} = E\{(\hat{T}_A - T_A)^2\}$, where $E\{\}$ is the ensemble expectation operator. The measurement uncertainty is comprised of two components: the uncertainty due to the naturally occurring noise of the measurand, $T_A$ (black body radiation) and the uncertainty in estimating the receiver response from the reference measurements. The output voltage 409, v(t), of the stable receiver 400 is linearly proportional to the reference noise power, 412, $T_i$. This relationship 500, is shown in FIG. 5. Output voltage 409 is then used in a processing algorithm 410, to create an ensemble set of measurements and derive estimates 411 of the measurand 408, $T_A$.

The uncertainty in the estimate $\hat{T}_A$ is also affected by the processing algorithm. When the noise references are stable and the receiver response g(t) is stationary in the first and second moment statistics, the uncertainty in $\hat{T}_A$ is predictable for a broad class of algorithms (i.e. for when $f$ is analytic). The predictable uncertainty provides a boundary constraint by which to detect deviations from the stationary assumption. The discrimination of small, non-stationary fluctuations in the receiver gain is enhanced through judicious selection of reference values and algorithms used to probe the process, for example, by temporally extrapolating the calibration measurements. Analysis of the ensemble data set in this way allows temporal fluctuations in the statistical moments to be measured and modeled.

Figure 6:
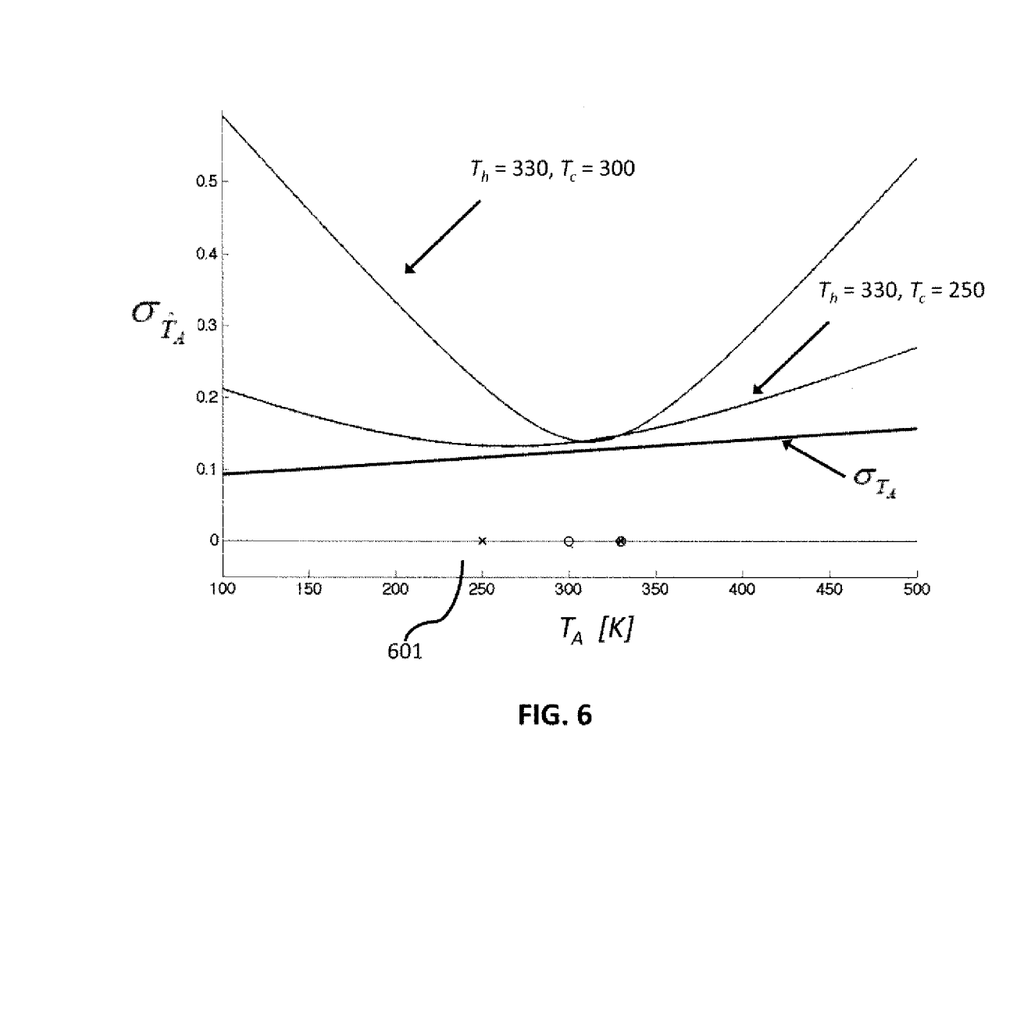
FIG. 6 illustrates uncertainty calculations of a reference value.

By treating each of the noise reference measurements as a realization of the receiver fluctuation, stochastic process theory can be used for calculating the uncertainty, $\sigma_{\hat{T}_A}$, a measure and -reference value ($T_A$). To illustrate, a stable radiometer which samples three stable noise references is modeled. A calibration algorithm utilizes two references to form an estimate of the third, i.e. $\hat{T}_A$. In FIG. 6 the uncertainty is shown as a function of the third reference temperature, $T_A$. Calculations are shown for two different pairs of reference values (indicated by o's and x's 601 on the abscissa). The dashed curve shows the uncertainty inherent in the measurement of $T_A$, i.e. $\sigma_{T_A}$. The solid curves are comprised of $\sigma_{T_A}$ and the uncertainty in the estimate of the receiver response. These curves are shaped by the reference values and algorithm $f$ with which $\hat{T}_A$ is calculated. To the extent the receiver and references are stable, the statistical moments of the measurand estimate are predictable and do not depend on the temporal spacing of the noise reference samples. These statistical moments form boundary conditions against which deviations from the stationary assumption can be detected and quantified.

Figure 7:
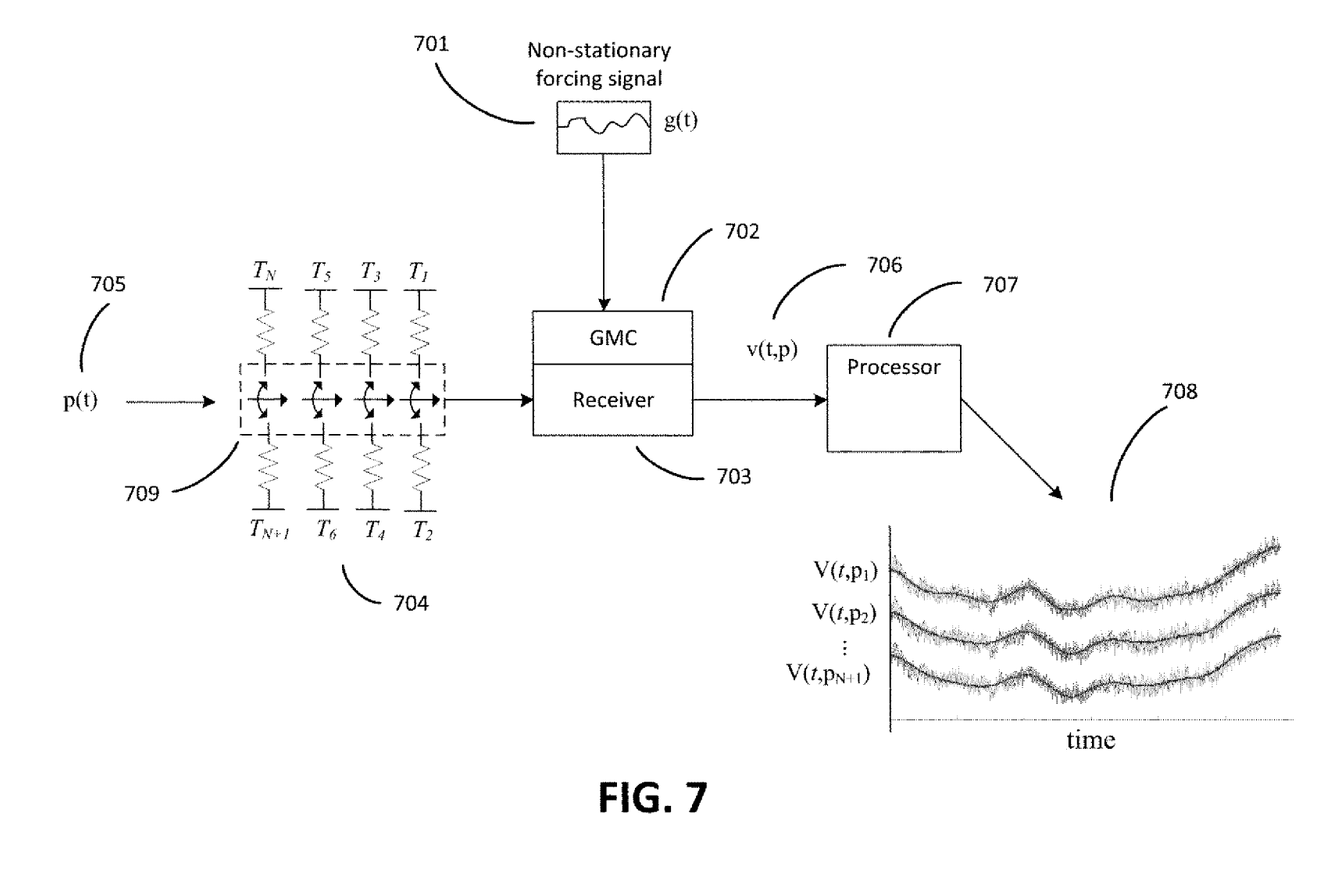
FIG. 7 illustrates an ensemble detector.

Analysis of a radiometer system in which gain fluctuations are induced by an external signal driving a gain modulation circuit is mathematically equivalent to that of a system where the gain fluctuations are caused by natural occurring fluctuations in the measurement system. This equivalency provides the basis for the application of Ensemble Detection to analyze and model non-stationary processes. There exists a broad set of embodiments where an ensemble detector may be used to analyze a signal under study. The concept entails mixing the signal under study with a plurality of noise references to produce an ensemble data set. Mixing the signal with noise references can be achieved by modulating the gain of an otherwise stable receiver that samples a number of noise references. FIG. 7 illustrates how one preferred embodiment of the present disclosure can be used to gather information about a signal under study.

In FIG. 7 a signal under study 701, g(t), is used to modulate the gain of an otherwise stable receiver 703 through a gain modulation circuit 702. A signal 705, p(t), drives a switching device 709 to alternately select each of a set of ultra-stable references 704, $T_1$ through $T_{N+1}$, which are applied to the modulated receiver 703. The receiver 703 produces an output voltage 706, v(t,p), containing information about the reference signals 704 and the signal under study 701. The output voltage 706 is provided to a processor 707 along with the switching signal 705 to decompose the output 706 into an ensemble set of measurements 708. The processor 707 can be a general purpose computer comprising components such as a Central Processing Unit (CPU), main memory, input/output devices, external storage, etc. as is well known in the art, e.g. a personal computer (PC), a laptop, a mainframe computer, etc. Processor 707 may also be implemented using specialized digital hardware such as field programmable logic arrays (FPLA), discrete digital components, microprocessors with mask programmed read only memory (ROM), etc. Processor can also be any combination of general purpose computing devices and dedicated digital hardware capable of executing machine-readable instructions, or operating on digital signals. The specific implementation of the processor is not germane to operation of the Ensemble Detector.

The signal under study 701, g(t), can be estimated from the ensemble set of reference noise measurements because the reference data have an a priori linear relationship, as shown in FIG. 5, and each realization contains information about the signal g(t). When g(t) is stationary in the first and second moment, the uncertainty in estimating g(t) is not affected by the temporal spacing of the reference measurements. Alternatively when g(t) is non-stationary, processing algorithms using temporally-spaced reference measurements reveal how the statistical moments of g (t) change over various intervals.

As an alternative embodiment, the reference noise signals 704, $T_1$ through $T_{N+1}$, and the signal under study 701, g(t), can be digitally sampled before they are applied to the switching device 709 and the gain modulation circuit 701. This allows the switching device 709, receiver 703, and gain modulation circuit 702 to be implemented in processor 707, resulting in a digital output signal 706 that can be operated on directly by processor 707 without further conversion. This digital embodiment has the advantage of eliminating latency and non-idealities, e.g. insertion loss, of a switch used to sequentially sample the noise references. Alternatively, the noise references can be implemented digitally using random number generators and computational algorithms in the processor.

It should now be apparent from the above described embodiments that Ensemble Detection is a technique whereby a signal under study is mixed with a range of noise powers of known value. The result is a set of noise-power measurements that comprise multiple realizations of the signal under study. Ensemble Detection, when paired with ensemble statistical analysis, for example with using temporally dependent algorithms, opens the door for new methods of signal analysis and a multitude of new applications.

Small deviations over intervals in which the process transitions from exhibiting stationary statistics to non-stationary statistics can be detected. Thus, Ensemble Detection is useful for studying processes where small changes embedded in what appears to be noise yield large-scale changes in other processes, e.g. stochastic resonance and butterfly effect.

Many applications for Ensemble Detection are for that from which the theory comes, i.e. radiometer design and analysis. For example, improved noise reduction techniques in radiometer calibration designs; new methods for specifying and qualifying receiver stability; improved understanding and modeling of noise in receivers. However, while some of the exemplary embodiments presented are applicable to radiometer systems it will be easily understood by persons of ordinary skill in the art that the ensemble detector and the ensemble detection process can easily be adapted to many other types of systems, such as radar, LIDAR, and interferometry, etc., without straying from the spirit and scope of the invention.

Measurable parameters using remote sensors are primarily stochastic, e.g. brightness temperature, scattering cross section, etc. Due to the changing nature of that being observed, these stochastic parameters are inherently non stationary. With the ability to detect and quantify time-varying statistical moments, Ensemble Detection offers tremendous potential for enhancing the information extracted from remote sensing data.

The functional form of the processing algorithm $f$ is not limited to a linear calibration applied to estimating an unknown measurand, $T_A$. Statistical properties of the algorithm output can be analytically evaluated for a large class of non-linear functions. The only limitation is that the function $f$ be analytic, i.e. differentiable. The values of the ultra-stable references define the range over which the function can be evaluated. Ensemble Detection, as a means of noise assisted data analysis using calibrated noise, enables a new class of 'Monte Carlo'-like simulations with which to characterize systematic effect of small statistical changes. Performing Ensemble Detection on multiple signals will enable new methods for change classification and comparative analysis of complex systems, e.g. climate-system modeling. Ensemble Detection, when combined with statistical analysis of the ensemble data sets and analytical modeling using stochastic process theory, will yield new insight into the nature and dynamics of changing systems.

Over the past decade Empirical Mode Decomposition (EMD) has emerged as a leading analysis tool for non-stationary data. Ensemble EMD has been introduced that significantly improves upon the original EMD's "sifting" algorithm by adding noise to the original signal and creating an ensemble data set on which to do EMD analysis. Instead of adding noise, the Ensemble Detector mixes the signal with calibrated noise. Mixing produces an a priori statistical relationship between the calibrated noise measurements and thus provides the means to enhance the information that can be extracted from a single realization or an ensemble set produced by adding noise. Using calibrated ensemble data sets on which to perform EMD provides the means of quantifying the contribution of EMD's intrinsic mode functions to uncertainty in the process. The ability to quantify the uncertainty in the intrinsic modes, combined with the means of modeling using stochastic-dynamic parameterization has great promise to advance the theoretical underpinnings and applications for EMD.

Figure 8:
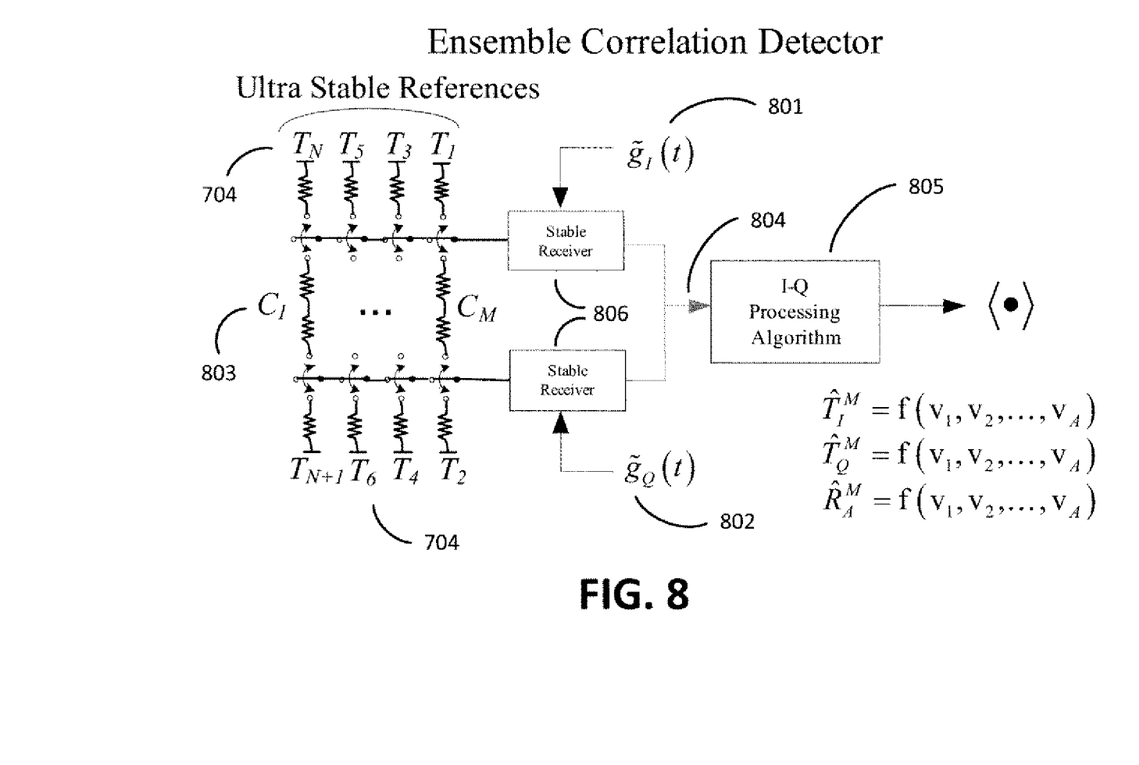
FIG. 8 illustrates an ensemble correlation detector.
Figure 9:
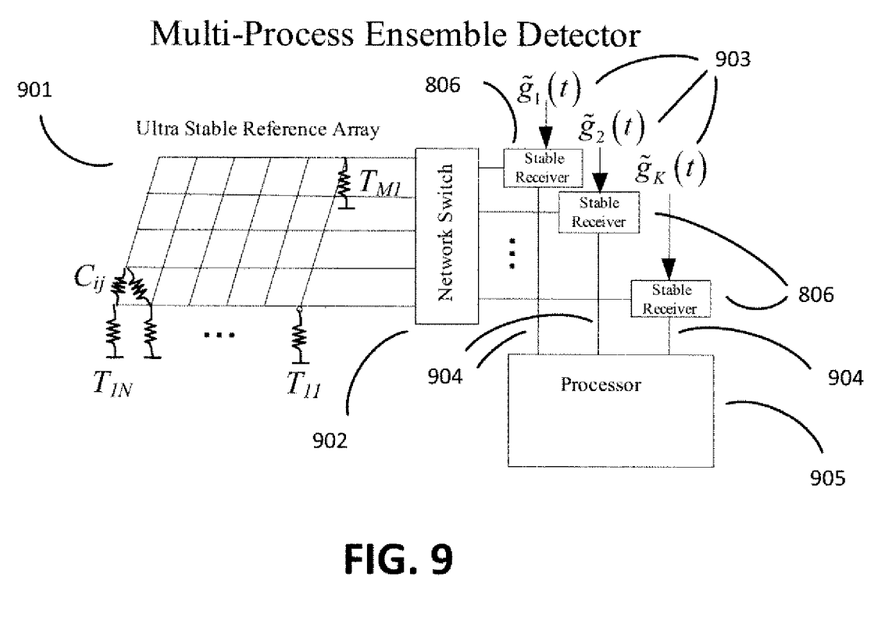
FIG. 9 illustrates a multi-process ensemble detector.

Extensions of the Ensemble Detector include the Ensemble Correlation Detector shown in FIG. 8 and Multi-Process Ensemble Detector shown in FIG. 9.

In the Ensemble Correlation Detector shown in FIG. 8, Ensemble Detection is applied to two signals, 801 and 802. Correlated noise sources 803 ($C_1 \ldots C_M$) provide reference with which to make calibrated ensemble measurements 804 of the cross correlation function. Note that the Stable Receivers 806 are comprised of a gain modulation circuit 702 and an otherwise stable receiver 703 as described above. These ensemble measurements 804 can then be applied to post processing algorithms such as the I-Q processing algorithm 805 shown in FIG. 8. The Ensemble Correlation Detector is applicable, for example, to I-Q Doppler processing of atmospheric data, cross-correlation of spatial radar data and communication data.

FIG. 9 depicts how Ensemble detection is applied to multiple processes. An ultra-stable reference array 901 provides correlated and uncorrelated calibration references that are selectively applied to the stable receivers 806 using a network switch 902. The gain of Stable Receivers 806 is modulated by the set of signals under study 903. The stable receiver output voltages 904 provide ensemble sets of measurements from which a processor 905 can compute estimates of autocorrelation and cross-correlation functions. Furthermore, non-linear algorithms can be applied to the reference data to study the performance of models which relate the functional dependency between the multiple processes under study.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An ensemble detector, the ensemble detector comprising:
   a receiver;
   a switching device coupled to the receiver, the switching device configured to selectively connect each of a plurality of reference noise signals to the receiver;
   and a gain modulation circuit coupled to the receiver and configured to vary a gain of the receiver based on a forcing signal by inducing gain fluctuations from an external signal driving said gain modulation circuit according to natural occurring fluctuations in a measurement system to analyze and model non-stationary processes by mixing the external signal with a plurality of reference noise signals to produce an ensemble data set;
   whereby the switching device selectively connects each of the plurality of reference noise signals to the receiver to produce an output signal derived from the plurality of reference noise signals and the forcing signal to produce an estimate of a measurand, $\hat{T}_A^M$ according to an equation:

$$\hat{T}_A^M = f(v_A(t_A), \{v_1(t_1), T_1\}, \ldots, \{v_N(t_N), T_N\})$$

where superscript M denotes an estimate where $T_A$ is constant, the standard deviation estimates the uncertainty in the estimate of the measurand by $\hat{\sigma}_{\hat{T}_A}^2 = \langle (\hat{T}_A^M - T_A)^2 \rangle$; wherein the ensemble data set is used to produce the output signal within the uncertainty of the estimate of the measurand.

2. The ensemble detector of claim 1 wherein the plurality of reference noise signals comprises one or more ultra-stable noise sources.

3. The ensemble detector of claim 1 wherein the plurality of reference noise signals comprises one or more calibrated noise references.

4. The ensemble detector of claim 1 further comprising a processor, the processor configured to decompose the output signal into an ensemble set of samples.

5. The ensemble detector of claim 4 wherein the plurality of reference noise signals and the forcing signal are digitized, and the switching device, the gain modulation circuit, and the receiver are implemented in the processor.

6. The ensemble detector of claim 5 wherein the plurality of reference noise signals comprises one or more signals generated digitally using a random number generator.

7. The ensemble detector of claim 1 wherein the receiver is a radiometer.

8. The ensemble detector of claim 7 wherein the gain modulation circuit and the forcing signal comprise an internal gain fluctuation of the receiver.

9. The ensemble detector of claim 7 wherein the switching device is a pin diode switch.

10. The ensemble detector of claim 7 where the plurality of reference noise signals comprises one or more coaxial terminations.

11. The ensemble detector of claim 7 where the plurality of reference noise signals comprises one or more noise diodes.

* * * * *